(12) United States Patent
Crider et al.

(10) Patent No.: US 8,490,050 B2
(45) Date of Patent: Jul. 16, 2013

(54) AUTOMATIC GENERATION OF USER INTERFACES

(75) Inventors: Anthony L. Crider, Mill Creek, WA (US); Stephen Schwink, New Haven, CT (US)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 12/104,439

(22) Filed: Apr. 17, 2008

(65) Prior Publication Data

US 2009/0265368 A1 Oct. 22, 2009

(51) Int. Cl.
*G06F 9/44* (2006.01)
(52) U.S. Cl.
USPC .......................................................... 717/108
(58) Field of Classification Search
None
See application file for complete search history.

(56) References Cited

U.S. PATENT DOCUMENTS

| | | | | |
|---|---|---|---|---|
| 5,327,529 A * | 7/1994 | Fults et al. | ...................... | 715/762 |
| 5,761,511 A * | 6/1998 | Gibbons et al. | ................ | 717/122 |
| 5,875,335 A * | 2/1999 | Beard | ............................ | 717/139 |
| 6,330,711 B1 * | 12/2001 | Knutson | ........................ | 717/100 |
| 6,518,979 B1 * | 2/2003 | Spertus et al. | ................. | 715/762 |
| 7,031,956 B1 * | 4/2006 | Lee et al. | .............................. | 1/1 |
| 7,065,744 B2 * | 6/2006 | Barker et al. | ................. | 717/109 |
| 7,587,425 B2 * | 9/2009 | Baikov et al. | .......................... | 1/1 |
| 7,739,414 B2 * | 6/2010 | Yi et al. | .......................... | 709/250 |
| 2002/0099738 A1 * | 7/2002 | Grant | ............................ | 707/513 |
| 2002/0147963 A1 * | 10/2002 | Lee | ................................. | 717/108 |
| 2002/0165995 A1 * | 11/2002 | Matula et al. | .................. | 709/316 |
| 2003/0070061 A1 * | 4/2003 | Wong et al. | ................... | 712/220 |
| 2003/0097486 A1 * | 5/2003 | Eisenstein et al. | ............ | 709/317 |
| 2003/0135657 A1 * | 7/2003 | Barker et al. | ................. | 709/310 |
| 2003/0182395 A1 * | 9/2003 | Lynch et al. | ................... | 709/218 |
| 2003/0182466 A1 * | 9/2003 | Such | ............................. | 709/315 |
| 2003/0221165 A1 * | 11/2003 | Young et al. | .................... | 715/505 |
| 2004/0030777 A1 * | 2/2004 | Reedy et al. | .................. | 709/224 |
| 2004/0146057 A1 * | 7/2004 | Yi et al. | ......................... | 370/401 |
| 2004/0168169 A1 * | 8/2004 | Ebro et al. | ..................... | 717/172 |
| 2004/0250237 A1 * | 12/2004 | Simonyi | ........................ | 717/105 |
| 2005/0091576 A1 | 4/2005 | Relyea et al. | | |
| 2005/0172263 A1 * | 8/2005 | Hariharan et al. | ............. | 717/109 |
| 2005/0203951 A1 * | 9/2005 | Schroeder et al. | ......... | 707/103 Z |
| 2005/0246389 A1 * | 11/2005 | Shah et al. | ..................... | 707/200 |
| 2005/0278622 A1 | 12/2005 | Betts et al. | | |
| 2005/0281276 A1 * | 12/2005 | West et al. | ..................... | 370/411 |
| 2006/0005177 A1 * | 1/2006 | Atkin et al. | .................... | 717/151 |
| 2006/0178945 A1 * | 8/2006 | Sidlo et al. | ....................... | 705/26 |

(Continued)

FOREIGN PATENT DOCUMENTS

WO 2005083983 A2 9/2005

OTHER PUBLICATIONS

"String Writer." Published Feb. 2007. http://stringwriter.com/2007/02/.*

(Continued)

*Primary Examiner* — Wei Zhen
*Assistant Examiner* — Adam R Banes

(57) ABSTRACT

A communications schema is captured into a service-neutral interface schema created by inspecting metadata received from an object and creating from it an abstract user interface model. A transform is applied to the abstract user interface model to generate a user interface that targets a particular user interface technology. Any user interface technology can be targeted so that a user interface for any user interface technology can be auto-generated.

18 Claims, 8 Drawing Sheets

U.S. PATENT DOCUMENTS

| | | | |
|---|---|---|---|
| 2006/0212836 A1 | 9/2006 | Khushraj et al. | |
| 2006/0282461 A1* | 12/2006 | Marinescu | 707/103 Y |
| 2007/0074121 A1* | 3/2007 | Mullender et al. | 715/744 |
| 2007/0083813 A1* | 4/2007 | Lui et al. | 715/709 |
| 2007/0124334 A1* | 5/2007 | Pepin | 707/104.1 |
| 2007/0150805 A1 | 6/2007 | Misovski | |
| 2007/0157096 A1* | 7/2007 | Keren et al. | 715/760 |
| 2007/0204233 A1 | 8/2007 | Savage et al. | |
| 2007/0209011 A1 | 9/2007 | Padmanabhuni et al. | |
| 2007/0220035 A1* | 9/2007 | Misovski | 707/102 |
| 2007/0255719 A1* | 11/2007 | Baikov et al. | 707/10 |
| 2007/0266384 A1* | 11/2007 | Labrou et al. | 718/100 |
| 2008/0005277 A1* | 1/2008 | Lynch et al. | 709/218 |
| 2008/0104060 A1* | 5/2008 | Abhyankar et al. | 707/5 |
| 2008/0114804 A1* | 5/2008 | Foti | 707/103 R |
| 2008/0163088 A1* | 7/2008 | Pradhan et al. | 715/764 |
| 2008/0294388 A1* | 11/2008 | Tabeling et al. | 703/1 |
| 2009/0031279 A1* | 1/2009 | Budinsky et al. | 717/104 |
| 2009/0254881 A1* | 10/2009 | Johnson et al. | 717/117 |
| 2009/0265368 A1* | 10/2009 | Crider et al. | 707/102 |
| 2010/0050174 A1* | 2/2010 | Zhou et al. | 718/1 |

OTHER PUBLICATIONS

"WPF/E—Microsoft's cross-platform XAML engine that runs in web browser." Jan. 10, 2007. http://ekrishnakumar.wordpress.com/2007/01/10/wpfe-microsofts-cross-platform-xaml-engine-that-runs-in-a-web-browser/.*

Li, et al., "CiteSeer: an Architecture and Web Service Design for an Academic Document Search Engine", WWW 2006, Dated:May 23-26, 2006, Edinburgh, Scotland. 2006, http://www.2006.org/programme/files/xhtml/p187/pp187-li/pp187-li-xhtml.html.

Balsoy, et al., "Automating Metadata Web Service Deployment for Problem Solving Environments", Future Generation Computer Systems, vol. 21, Issue 6 (Jun. 2005), Year of Publication: 2005, pp. 910-919.

* cited by examiner

AUTOMATIC GENERATION OF USER INTERFACES

BACKGROUND

A user interface allows a person (a user) to interact with a particular machine, device, computer program or other complex tool. Typically a user interface provides a way for the user to input information and a way for the machine to provide information back to the user (i.e., for the machine to provide output). Input typically allows the user to manipulate the system while output allows the system to convey the effect(s) of the user's manipulation.

Two common types of computer user interfaces are graphical user interfaces and web-based user interfaces. A graphical user interface or GUI is a type of user interface that allows a user to interact with a computer and computer-controlled devices by presenting graphical icons, visual indicators or graphical elements, sometimes in conjunction with text, labels or text navigation, to represent information and actions available to the user. Instead of offering only text menus, or requiring typed commands, an action is usually performed through direct manipulation of graphical interface elements called controls.

A control is an interface element with which the user interacts, such as a window, a button or a text box. A control provides a single interaction point for the direct manipulation of a particular kind of data. Controls are also visual basic building blocks which, when combined in an application, hold the data processed by the application and control the available interactions on the data.

A second common type of user interface is the web-based user interface. A web-based user interface accepts input and provides output by generating web pages which are transmitted via the Internet and viewed by the user using a web browser program. Newer implementations utilize Java, AJAX, Adobe Flex, Microsoft .NET, or similar technologies to provide realtime control in a separate program, eliminating the need to refresh a traditional HTML-based web browser.

SUMMARY

User interfaces for any end-user scenario can be auto-generated from an abstraction representing a service-neutral interface schema. A communication class object can be inspected and by analysis of the class object's metadata through reflection, published type library, etc., the service-neutral interface schema can be created. The service-neutral interface schema can be converted using a service-specific transformation to auto-generate a service-specific user interface. Any interface technology can be targeted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

It would be useful to be able to auto-generate user interfaces that target any desired end-user interface technology including but not limited to Windows Forms, WPF (Windows Presentation Foundation), JAVA AWT, JAVA Swing, SVG, X/Window System (X11), and Apple's Quartz. In accordance with aspects of the subject matter disclosed herein, a communication class object can be inspected and by analysis of the class object's metadata through reflection, published type library, etc., a service-neutral interface schema can be created. Abstract UI elements can be extracted from web services connection classes and can be represented in a service-neutral way in an interface schema. The service-neutral interface schema can be converted using a service-specific transformation to auto-generate a service-specific user interface.

Automatic Generation of User Interfaces

Figure 1:
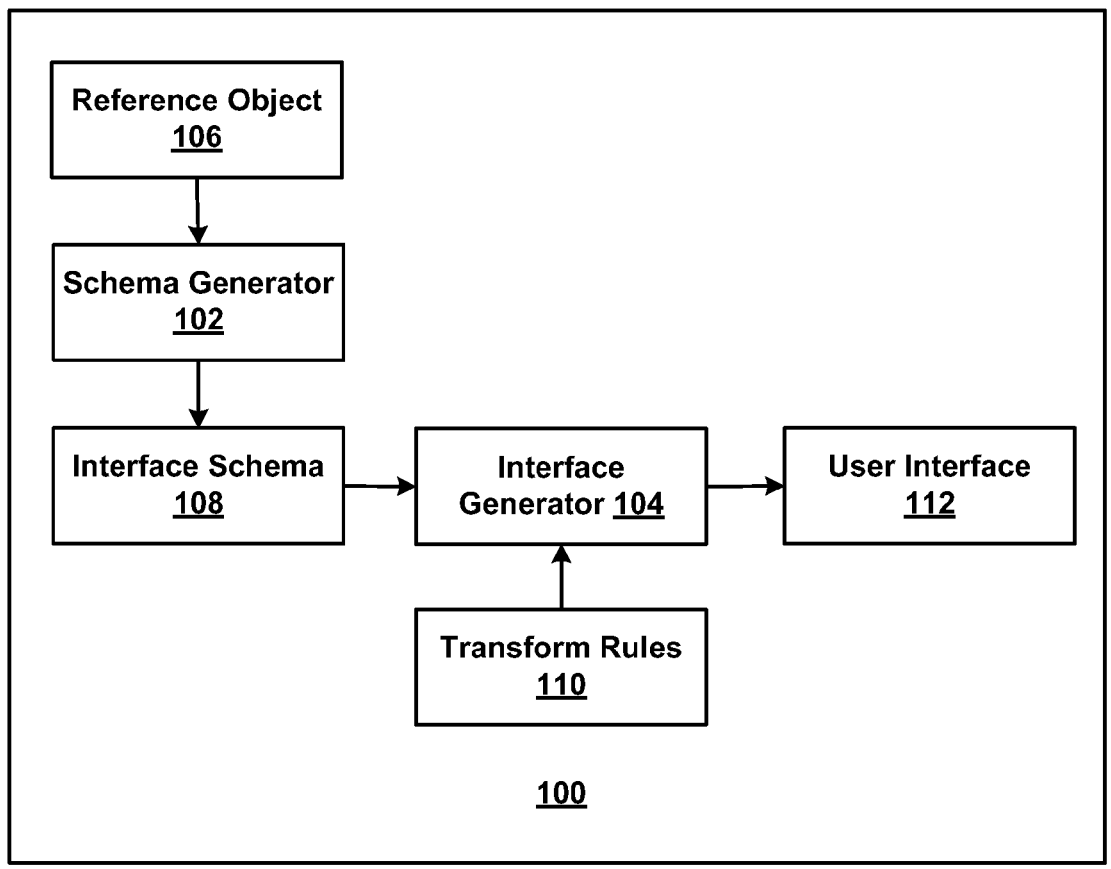
FIG. 1 is a block diagram of a system for auto-generating a user interface in accordance with aspects of the subject matter disclosed herein.

FIG. 1 illustrates a block diagram of a system for automatic generation of a service-specific user interface from a service-neutral interface schema in accordance with aspects of the subject matter disclosed herein. System 100 may include one or more of the following: a schema generator 102, an interface generator 104, a reference object 106, the reference object 106 being an input to the schema generator 102, an interface schema 108, the interface schema 108 being an output of the schema generator 102 and an input to the interface generator 104, a transform 110, the transform 110 being an input to the interface generator, and a user interface 112, the user interface 112 being an output of the interface generator 104. System 100 or portions thereof may reside on one or more computers connected via a network as described below with respect to FIG. 3. System 100 may comprise a portion of an integrated development environment such as the one described with respect to FIG. 4 or may be implemented as a stand-alone system or as a plug-in.

Figure 2A:
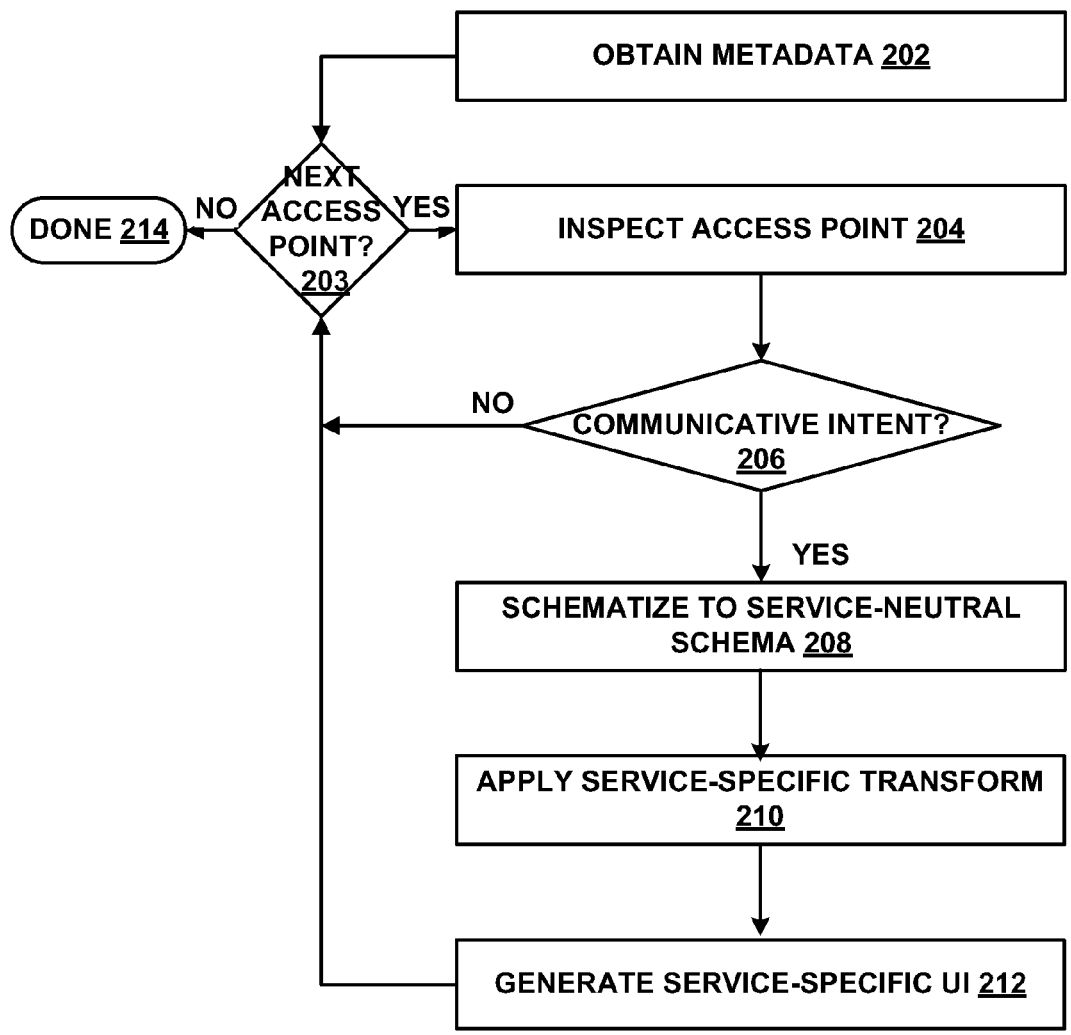
FIGS. 2a-2g are flow diagrams of methods concerning aspects of auto-generating a user interface in accordance with the subject matter disclosed herein.

FIG. 2a illustrates a method for auto-generation of service-specific user interfaces from generic interface schemas in accordance with aspects of the subject matter disclosed herein. At 202 the metadata for a class object is obtained. As described more fully below, metadata may be obtained by reflection, by accessing published type libraries or by any suitable means. Metadata provides information about the class object. For example, the metadata of an object may include a description of ways to interact with that class object. Typically an object is accessible via its methods and properties. In accordance with aspects of the subject matter disclosed herein, private methods and properties may not be processed further, that is, private methods and properties may be filtered out so that only public methods and properties are processed further. A private access point is one that is not accessible to other objects outside the process in which the private access point is running. A public access point is one that is accessible to other objects outside the process in which the access point is running.

At 203 the next access point in the metadata is retrieved (e.g., for each property and method described by the metadata). If no next access point is available, processing terminates at 214. If a next access point is available, the access point is examined at 204. and the communicative intent of the access point is determined at 206. Communicative intent may be determined based on compliance of the access point with a provided schema pattern. In accordance with aspects of the subject matter disclosed herein, and as described more fully below, communicative intent may be determined by determining if the access point has both an input and an output. If the method does not have communicative intent the next method may be examined, processing returning to 203.

If the access point does have communicative intent, the access point may be schematized or converted to a service-neutral representation at 208, as described more fully below. At 210 a UI-specific transform may be applied to the service-neutral representation and at 212 a service-specific user interface based on the service-specific transform may be auto-generated. Upon generation of the service-specific UI, the next method may be examined, processing returning to 203.

Referring again to FIG. 1, in performing the method described above, a schema generator 102 may inspect a reference object 106. The reference object 106 may be an abstract class object, non-abstract class object, or an instantiated object. While an object is an instance (or instantiation) of a class object, a class object is a combination of data and the instructions that operate on the data, making an instantiated object capable of receiving messages, processing data, and sending messages to other objects. To make an analogy to the physical world, if a person wanted to live in a house, a blueprint for the house would not be useful. A real house constructed according to specifications (e.g., from the blueprint) is required to live in. In this analogy, the blueprint represents a class object, and the real house represents the instantiated object.

The schema generator 102 may ask the reference object 106 for its metadata. The reference object 106 may provide its metadata to the schema generator 102. The ability of an object to return its metadata to a requester is called reflection, which differs from instantiation because no object is produced. (Hence, an abstract class object may be asked for its metadata but an abstract class object cannot be instantiated). Thus, when the reference object 106 is asked for its metadata, an object is not instantiated, instead, the reference object returns its metadata to the requester. More generally, the metadata may be obtained from any metadata description service, including such metadata services as WSDL, XAML, HTML, or published type library.

However provided, metadata includes information about how an object can be accessed. An object can be acted upon via access points such as methods and properties. Thus, the metadata received by the schema generator 102 can be information concerning each of the methods and properties of the reference object 106.

A method of a class object can be inspected by the schema generator 102 to determine if the method qualifies as one that implies communicative intent. A method implies communicative intent if the method constitutes a portion of a dialog (is a communication) between two entities. That is, in principle, a method has communicative intent if the method has both at least one input and at least one output where a logical link exists between the input and the output. A logical link exists between the input and the output if the output generated depends on the content of the input (i.e., is deterministic).

A generic schema to determine if an inspected method qualifies as a communicative method can be provided by providing one or more rules, constraints or conditions such that any method that satisfies the rules, constraints or conditions is a method that implies communicative intent. In accordance with some aspects of the subject matter disclosed herein, for a given class object, any method of the class object constitutes a communication (displays communicative intent) if its input types fall within a specified range of numerical and/or string values where some of those numerical and string values can be constrained into subsettable enumerable types, meaning that the allowable numerical and string values are included within a specified range or set of acceptable values. Furthermore, to qualify as communicative, each method may have to have an output type, (i.e., returns some value). Each of the inputs may be describable as a simple set of data types. Each of the outputs may be describable as a simple set of data types. If the method has communicative intent, the method can be transformed into a user interface that allows cooperation between an external client and the class object. The same is true for properties.

A method having communicative intent differs from a method that does not have communicative intent in that a method that does not have communicative intent can receive input but does not derive output from the input, or produces output but does not accept input. That is, at the end of the processing of an input using a non-communicative method, it is indeterminate what the resulting output should be for that communication. Similarly, a property having communicative intent differs from a property that does not have communicative intent in that a property that does not have communicative intent takes input but does not derive output or produces output but does not accept input. By schematizing at least some of the properties and methods of a class object, (e.g., by schematizing those properties and methods that imply communicative intent), UIs appropriate for any particular technology can be programmatically auto-generated. In this context, schematization embraces the idea of overlaying a description of a UI transformation into a class object.

When a method or property of the reference object 106 is determined to have communicative intent, the property or method description can be schematized to produce a generic interface schema 108 which is an internal abstraction of the class object's communicative methods and properties. The schema generator 102 may abstract UI elements from a reference object 106 comprising a class object based on the premise that there is a class dedicated to describing a communication contract with some (any arbitrary) service endpoint. In accordance with some aspects of the subject matter disclosed herein, private methods and private properties are not schematized.

A public method may be expected to take the form:

```
output_class_type
    CommunicationIdentifier(
        input_class_type₁ input_field₁,
        input_class_type₂ input_field₂, ...)
```

The communication class, consequently follows the form:

```
class CommunicationClassIdentifier{
    public output_class_type₁
        CommunicationIdentifier1(
            input_class_ type₁₁ input_field₁,
            input_class_ type₁₂ input_field₂, ...)
    public output_class_type₂
        CommunicationIdentifier2(
            input_class_type₂₁ input_field₁,
            input_class_type type₂₂ input_field₂, ...)
```

Each input_class_type and each output_class_type may permit inspection of its metadata.

According to aspects of the subject matter disclosed herein, data types may be reduced to three general categories: simple scalars, arrays and complex structures. Complex structures are composites of the three types. Arrays are multi-valued types and can be composed of a single array or a single complex or a single simple type. When an array type composes another array type, the array type becomes multidimensional. When an array type composes a complex structure type, the array becomes an array of multi-values. When an array type composes a simple scalar, the array becomes an array of simple values. Simple scalar types are divided into strings and numbers and are subclassed by the enumeration types. Enumeration types are defined in terms of the subset of allowable values and take on the scalar type of their superclass.

Figure 2B:
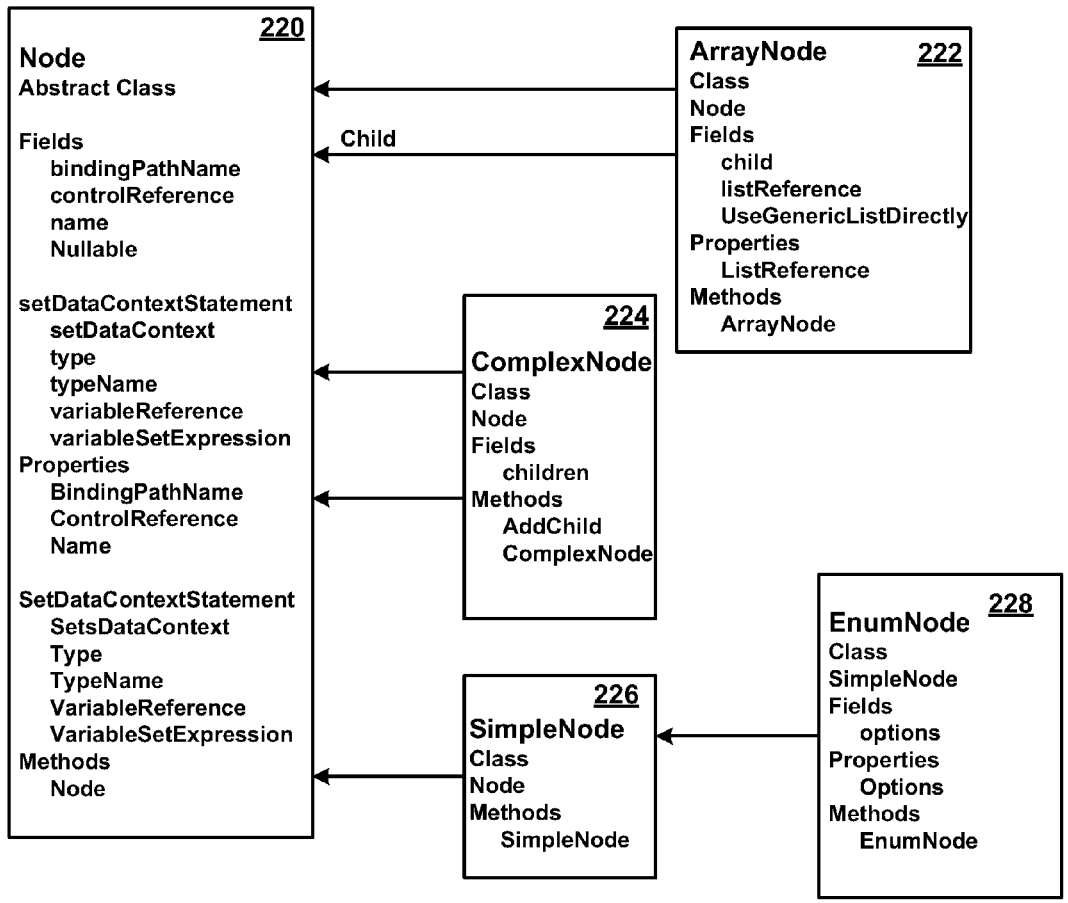

FIG. 2b illustrates an example of an abstraction used to map communication data types to a model representation in the form of a directed acyclic graph or tree. As the communication class type 220 is reflected over, a node structure 222, 224, 226, 228 is projected. The node structure according to some aspects of the subject matter disclosed herein is a directed acyclic graph (a tree). ComplexNodes (e.g., ComplexNode 224) and ArrayNodes (e.g., ArrayNode 222) are non-terminal nodes and SimpleNodes (e.g., SimpleNode 226) are terminal. For any communication data type class, a ComplexNode is created, unless the class is a collection class. Collection classes are those that implement some variety of the ICollection interface and if implemented by a communication data type class result in ArrayNodes.

Referring again to FIG. 1, once the generic interface schema 108 is generated, a transform 110 appropriate for the targeted user interface technology can be applied to it by the interface generator 104 to generate the UI 112. The type of transformation applied to the interface schema 108 depends on what the target technology is. The type of user interface 112 generated depends on the type of transform 110 provided.

Conversion of a communication class abstraction to a target technology may be achieved through a normalized mapping of the directed acyclic graph or tree to user interface controls that permit the correct data types for the terminal nodes. This general model applies to the conversion to a Windows Forms form, to a WPF form, or any other target rendering model. The base code generation class permits derivation to any desired target technology. In accordance with some aspects of the subject matter disclosed herein, the WPF code generation class permits the creation of WPF XAML, VB .Net, or C#. The WPF Operation code generation class permits the creation of WPF XAML on the basis of a web services operation.

Figure 2C:
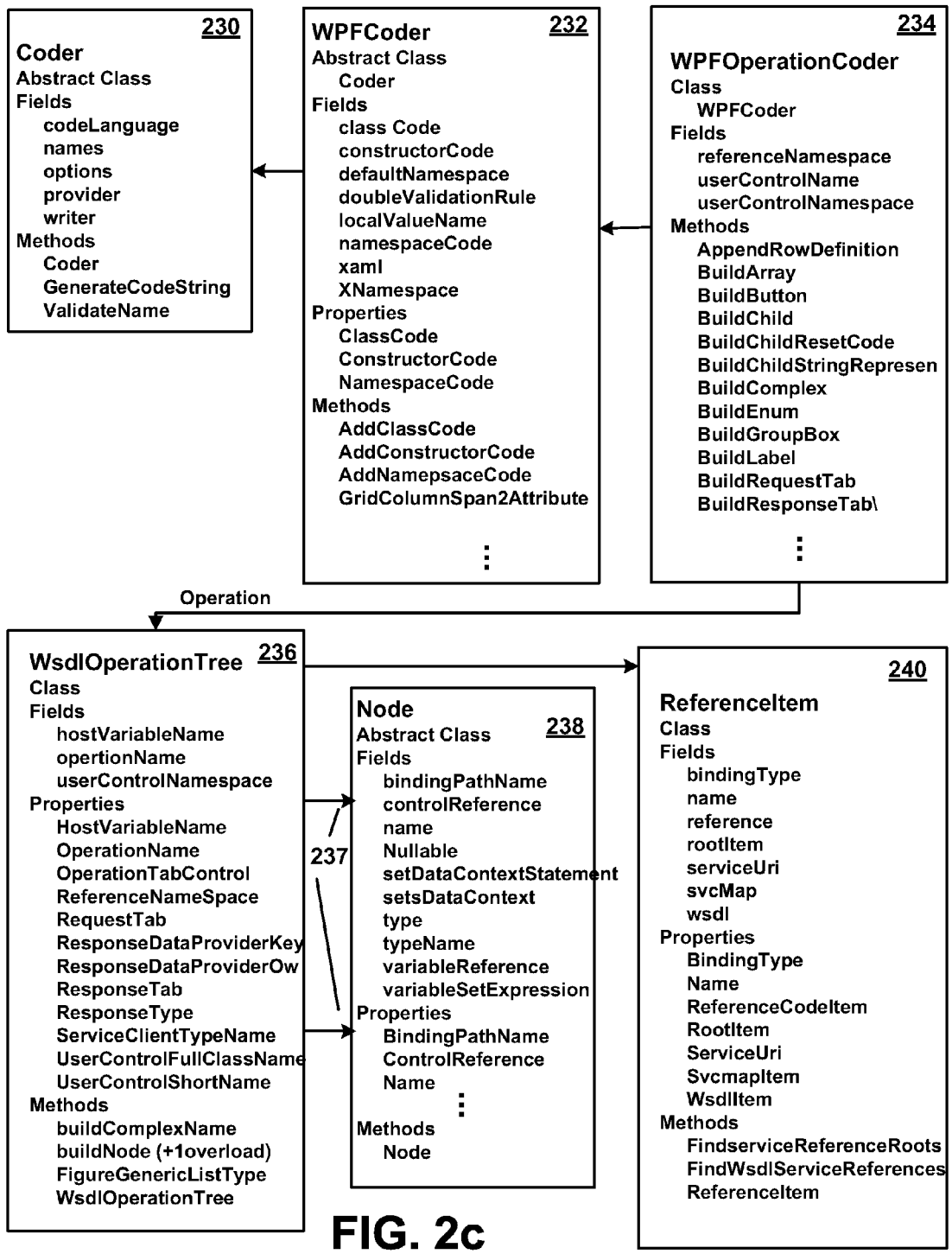

FIG. 2c illustrates an example of dependent relationships in accordance with aspects of the subject matter disclosed herein. FIG. 2c represents a description of a particular implementation that targets 2 technologies, the web service description language (WSDL) and WPF, although it will be appreciated that the subject matter disclosed herein is not limited thereto. Web services in this example is a communicative source. A transform may convert a web services description to a set of class objects. The set of class objects permit an abstraction that allows programmatic communication with a web service. In FIG. 2c, a web services schematization is combined with a WPF transform to auto-generate a user interface for the WPF platform.

In FIG. 2c, the WsdlOperationTree 236 is the class object created when a web service class object 240 is schematized. The WPFCoder 232 is the transform applied to the WsdlOperationTree 236 to generate a UI for that class object. For example, the WsdlOperationTree 236 has "I/O parts" 237 as a reference. The input/output parts 237 is the node abstract class 238 which generates the relevant tree (as shown in FIG. 2b). From that tree the appropriate user interface can be generated. The WsdlOperationTree 236 is the abstraction or schematization of a web service and is supplied as input to the WPFOperationCoder 234. The operation referred to is a single instance of a method with communicative intent that is transformed into a user interface.

The Abstract class Coder 230 may represent the minimum information to provide a transform so that code can be generated. The writer (under Fields) in the Abstract Class Coder 230 is an object which writes the information out to disk. The provider (under Fields) is a source for the writer and allows for generation of code. Options on how the code is written are provided, as well as the language in which the code is written (e.g., codeLanguage) and the names for instances of files that are written out. The provider, in accordance with aspects of the subject matter disclosed herein is able to target any end-user platform, including but not limited to VB.NET, C#.NET, C++, JAVA or any other platform for which managed or unmanaged code can be generated. The Abstract Class WPFCoder 232 provides information specific for WPF transforms. Thus, any WPF transform of any arbitrary UI technology to be generated for, has to have at least this information to be able to create a WPF UI.

The WPFOperationCoder 234 is an instance of a coder that is specific to transforming the operation described in the WsdlOperationTree 236. It will be apparent that while any general operation could be described, FIG. 2c illustrates a specific kind of operation to be consumed (a WSDL operation) as an example which is not be construed to be limiting. The WPFOperationCoder 234 is the first object created. The WsdlOperationTree object contains the complete abstraction for a given class object. ReferenceItem 240 is the object to be transformed. ReferenceItem 240 is an object that describes the actual class to be consumed and transformed into an internal representation. It points at the class object. It has a description of the actual description language, it has a reference to the service map (SrvcmapItem), a reference to the Uri (ServiceUri), needed to understand how to communicate with the web service. The rootItem points to the object to be communicated to. The WsdlOperationTree 236 consumes the ReferenceItem 240 to generate the I/O parts described by the Node Abstract Class 238. Once the I/O parts are consumed, the I/O parts are divided into request tabs (RequestTab) and response tabs (ResponseTab) in the Fields of the WsdlOperationTree 236.

Thus a WsdlOperationTree 236 is constructed from the ReferenceItem 240 using the build methods of the WsdlOperationTree 236. The whole tree is constructed at initialization time using internal build operations to perform that work. When initialization of the WsdlOperationTree 236 is complete, there is a set of I/O parts that describe I/O items for all communication extracted from ReferenceItem 240, divided into request tabs and response tabs, as a product of how operations are to be communicated through the UI. The WsdlOperationTree 236 is then passed to WPF coder 232 which then generates the code that can be incorporated into any project.

As a specific example, to effect the creation of the WPF XAML that corresponds to a web services operation, the following may be executed:

```
void Execute( )
{
    TaskPaneCoder form = new TaskPaneCoder(language,
    paneClassName);
    foreach (operation in operations)
    {
        Operation.WsdlOperationTree op =
            new Operation.WsdlOperationTree(
                operation,
                referenceIndex,
                referenceNameSpace,
                referenceItem);
        ProjectItem xamlControlItem =
            AddUserControl(
                userControlsDir.ProjectItems,
                wpfUserControlTemplatePath,
                operation.Name + ".xaml");
        WPFOperationCoder coder =
            new WPFOperationCoder(
                xamlDocument,
                language,
                op,
                referenceNameSpace,
                userControlNamespace);
        form.AddOperation(op);
        InsertRootItemCode(
            xamlCodeItem,
            coder.ConstructorCode,
            coder.ClassCode,
            coder.NamespaceCode);
    }
}
```

For every operation that is determined to be a part of the base communication class, the operation may be reduced to a WsdlOperationTree, the directed acyclic graph of Node elements. A WPF user control is added to the project. A code generation worker is created and finally the code is generated into the root of the WPF user control.

In pattern, a translation engine may follow the above relationship schema and in general terms, the preceding Execute( ) function may take the form:

```
define Execute(language, communications) :
    foreach (communication in communications) :
        communicationTree =
            CreateCommunicationTreeFrom(communication)
        communicationTree.Project( )
        document =
            CreateDocument( )
        coder =
            CreateCommunicationCoder(
                document,
                language,
                communicationTree)
        coder.Generate( )
        document.Save( )
```

Figure 2D:
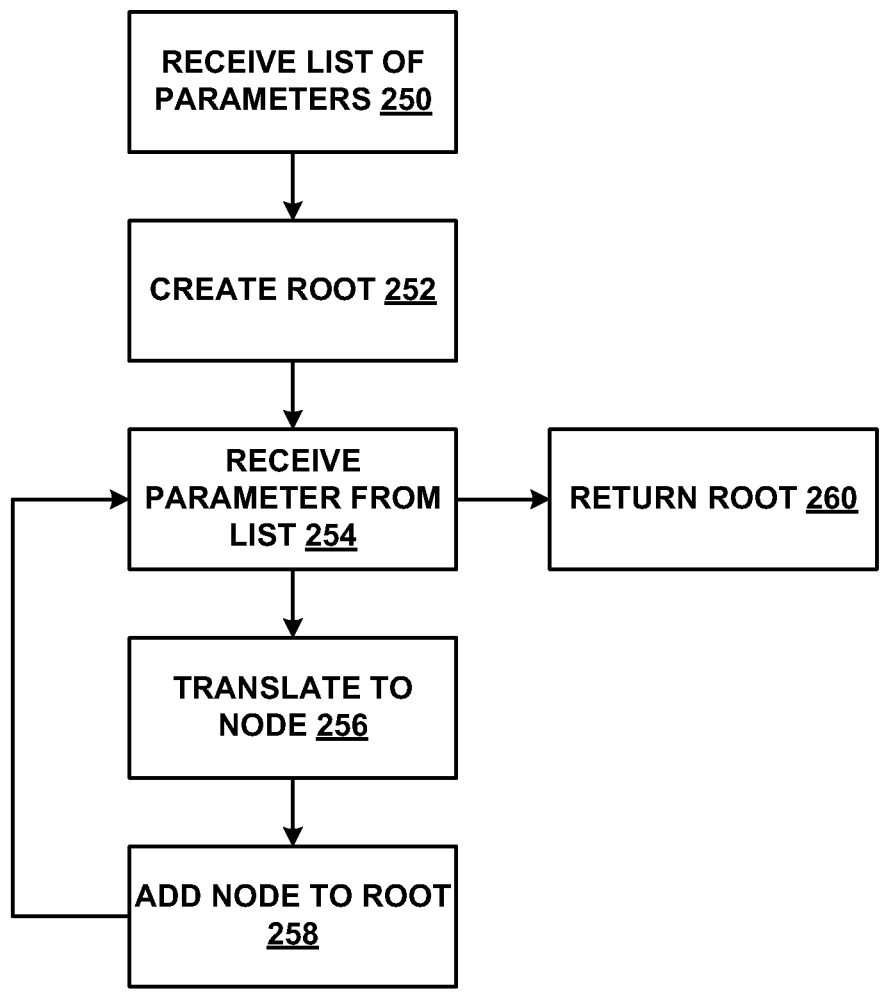

FIG. 2*d* provides a simple overview of the introspection process, which builds a tree representing the methods of the reference object. For each method from a class object type, a list of parameters from that method is received at 250. At 252 an empty root is created for the tree. At 254 the next parameter is taken from the parameters list. At 256 the parameter is converted into the appropriate Node type. (This may also determine the layout order when rendering to UI elements.) At 258 the node is added to the root and the next parameter from the list is processed (repeating 254, 256, and 258 for each parameter). When all the parameters have been processed, the resultant root tree node is returned at 260.

Figures 2E, 2F, 2G:
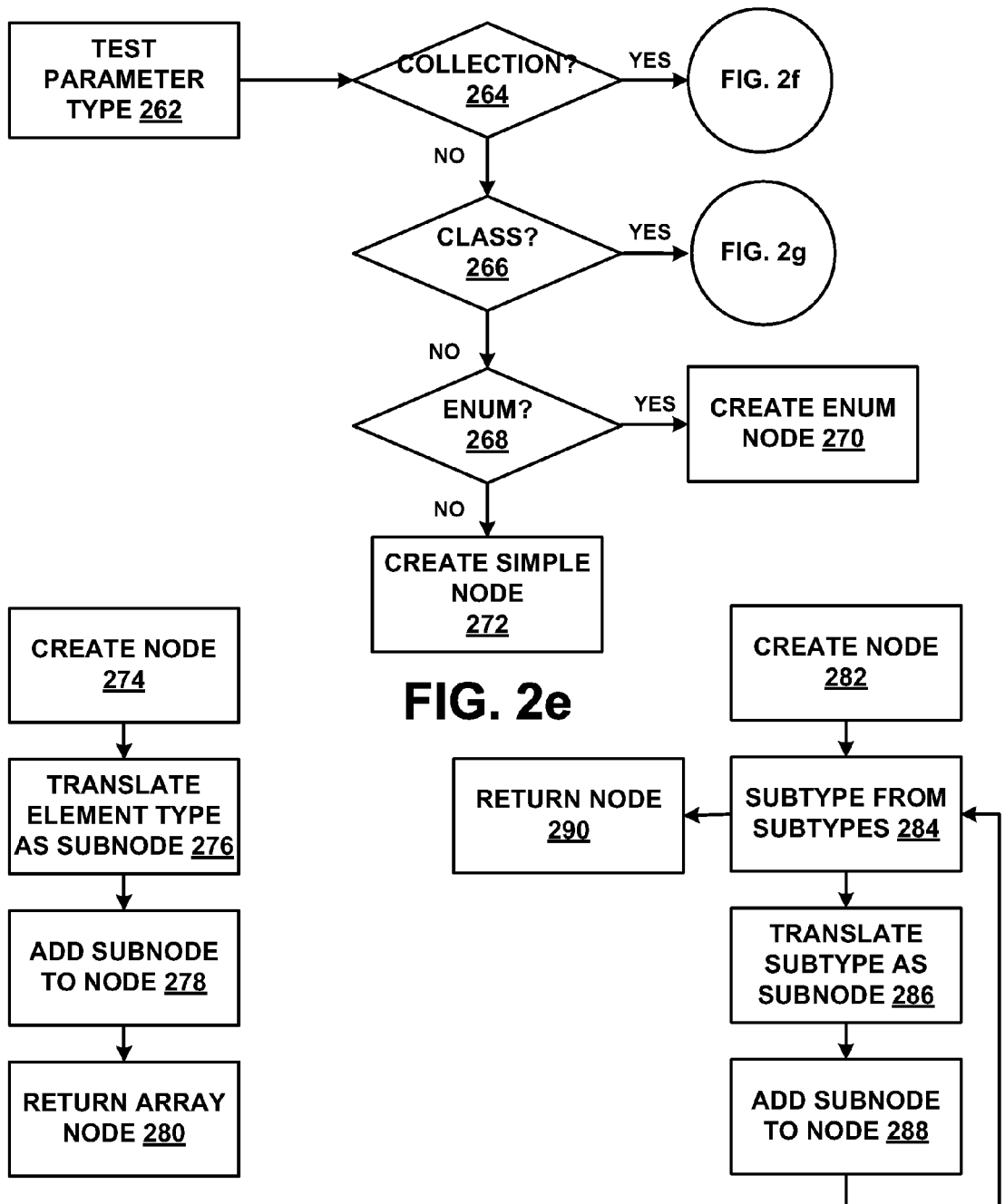

FIG. 2*e* is a more detailed description of translating a parameter to a node (256 of FIG. 2*d*). At 262 the type of the parameter is tested. If the parameter type is a collection type 264, an array node is created and returned (see FIG. 2*f*). If the parameter type is a class type 266, a complex node is created and returned (see FIG. 2*g*). If the parameter type is an enumeration type 268, an enum node is created and returned 270. In this case, it is a simple type (e.g., string, integer, double, etc.) such that a predefined subset of values is known by virtue of the enumeration type. This information is extracted and stored as part of the enum node along with the corresponding simple type. If the parameter type fails to satisfy the previous three tests, it is a simple scalar type and a simple node is created by recording the relevant type 272.

FIG. 2*f* illustrates translation of a collection type into an array. At 274 a node is created. At 276 the element type is translated into a node by recursively calling the process detailed in FIG. 2*e*. At 278 the node is a subnode and is added to the node for the element of the collection being processed. When all the elements in the collection have been processed the resulting array node is returned at 280. FIG. 2*g* illustrates translation of a class type into an array. The class type encapsulates multiple types into a single type. At 282 a complex node is created to model the class. At 284 a subtype is received from the subtype class. The subtype of the class is then translated into a node at 286 by recursively calling the process detailed in FIG. 2*d*. The result of the translation is assigned to the array node at 288. All the subtypes of the class are processed (284, 286, 288) and the resulting array node is returned at 290.

Example of a Suitable Computing Environment

Figure 3:
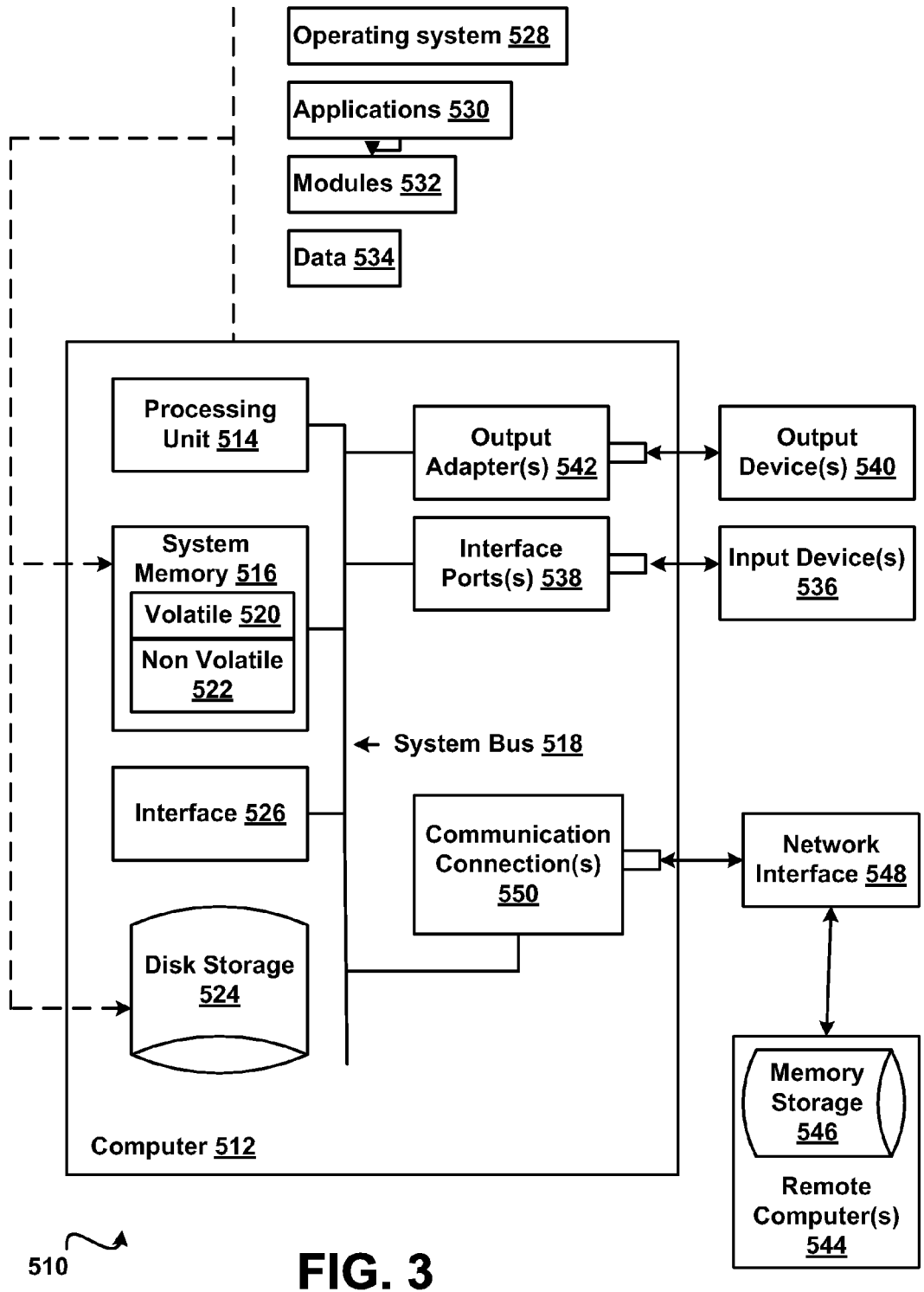
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combination s of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require special adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
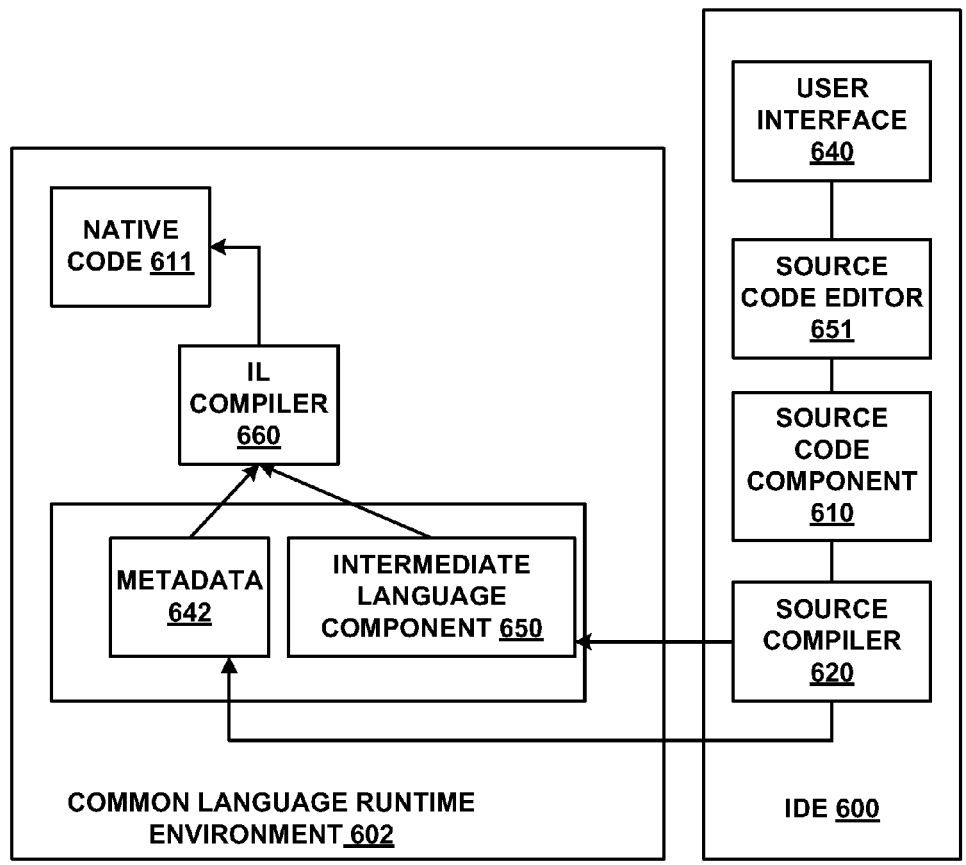
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system configured to generate a user interface comprising:
a processor configured to execute the following computer executable components;
a schema generator configured to receive metadata for a reference object and further configured to generate from the metadata a service-neutral interface schema for reference object access points determined to have communicative intent, wherein the service-neutral interface schema is an abstraction of the reference object access points identified from an analysis of the metadata, wherein the schema generator is configured to determine if an access point to the reference object implies communicative intent by determining whether the access point has both an input and an output that complies with a provided service-specific schema pattern, wherein the output is produced as a result of the input; and
a user interface generator configured to receive the service-neutral interface schema and a transform directed to a particular target platform and further configured to generate a service-specific user interface from the transform and the service neutral interface schema generated from the metadata.

2. The system of claim 1, wherein the schema generator is configured to request the reference object for the metadata and the reference object returns the metadata via reflection.

3. The system of claim 1, wherein the schema generator is configured to use introspection to create an abstract interface schema from the metadata.

4. The system of claim 1, wherein the user interface generator is configured to generate a user interface targeted to a target platform based on a service-specific transform.

5. The system of claim 1, wherein the user interface generator is configured to generate a user interface targeted to a Windows Presentation Foundation (WPF) platform from a web services communication class.

6. A method of auto-generating a user interface comprising:
analyzing metadata associated with a reference object to ascertain whether the reference object is accessible to other objects; and
identifying at least one reference object access point as having communicative intent from the analyzing of the metadata;
determining if the at least one reference object access point implies communicative intent by ascertaining whether the at least one reference object access point has both an input and an output that complies with a provided service-specific schema pattern
schematizing the at least one reference object access point if the at least one reference object is determined to have communicative intent, the schematizing comprising generating a generic internal representation of the at least one reference object access point; and
applying a transform directed to a particular target platform to the generic internal representation to programmatically auto-generate a target-specific user interface.

7. The method of claim 6, further comprising filtering out private methods from the metadata wherein a private method is not represented in the generic internal representation.

8. The method of claim 6, wherein the particular target platform is a Windows Presentation Foundation (WPF) platform.

9. The method of claim 6, wherein the particular target platform is a web services platform.

10. A computer-readable memory comprising computer-executable instructions which when executed cause a computing environment to:
schematize a reference object according to an analysis of metadata associated with a reference object, wherein at least one reference object access point is schematized according to whether the analysis of the metadata reveals a communicative intent of the at least one reference object access point;
determine via the analysis an existence of the communicative intent by determining if an access point to the reference object has both an input and an output that complies with a provided service-specific schema pattern; and
auto-generate a service-specific user interface targeted to a particular platform by applying a target-specific transform to a service-neutral internal representation of the at least one reference object access point.

11. The computer-readable memory of claim 10, comprising further computer-executable instructions, which when executed cause the computing environment to:
determine that the at least one method or property display communicative intent by compliance of the at least one method or property with a provided schema.

12. The computer-readable memory of claim 10, comprising further computer-executable instructions, which when executed cause the computing environment to:
create a directed acyclic graph representation to represent a service-neutral interface schema.

13. The computer-readable memory of claim 10, comprising further computer-executable instructions, which when executed cause the computing environment to:
generate Windows Presentation Foundation (WPF) XAML from a web services operation.

14. The computer-readable memory of claim 10, comprising further computer-executable instructions, which when executed cause the computing environment to:
generate VB.Net, or C# user interface code.

15. The computer-readable memory of claim 10, comprising further computer-executable instructions, which when executed cause the computing environment to:
build a tree representing methods of the reference object, wherein for each method a list of parameters is received, an empty root is created for the tree, a next parameter is taken from a parameters list for each method, the next parameter is converted into a node, the node is added to the root and wherein when all the parameters in the parameters list have been processed, a resultant root tree node is returned.

16. The computer-readable memory of claim 15, comprising further computer-executable instructions, which when executed cause the computing environment to:
test the next parameter for type, and in response to determining that the next parameter is a collection type, create an array node.

17. The computer-readable memory of claim 15, comprising further computer-executable instructions, which when executed cause the computing environment to:

test the next parameter for type, and in response to determining that the next parameter is a class type, create a complex node.

18. The computer-readable memory of claim 15, comprising further computer-executable instructions, which when executed cause the computing environment to:
test the next parameter for type, and in response to determining that the next parameter is an enumeration type, creating an enum node or in response to determining that the next parameter is not a collection type or a class type or an enumeration type, create a simple node.

\* \* \* \* \*

UNITED STATES PATENT AND TRADEMARK OFFICE
CERTIFICATE OF CORRECTION

PATENT NO.      : 8,490,050 B2  
APPLICATION NO. : 12/104439  
DATED           : July 16, 2013  
INVENTOR(S)     : Crider et al.

Page 1 of 1

It is certified that error appears in the above-identified patent and that said Letters Patent is hereby corrected as shown below:

In the Specification

In column 1, line 38, delete "realtime" and insert -- real-time --, therefor.

Signed and Sealed this  
Third Day of February, 2015

Michelle K. Lee  
*Deputy Director of the United States Patent and Trademark Office*